(12) United States Patent
Nixon

(10) Patent No.: US 7,452,945 B2
(45) Date of Patent: Nov. 18, 2008

(54) AMBIENT TEMPERATURE CURING COATING COMPOSITION

(75) Inventor: Steve Alister Nixon, Whitley Bay (GB)

(73) Assignee: Akzo Nobel Coatings International B.V., Arnhem (NL)

(*) Notice: Subject to any disclaimer, the term of this patent is extended or adjusted under 35 U.S.C. 154(b) by 413 days.

(21) Appl. No.: 10/540,938

(22) PCT Filed: Jan. 26, 2004

(86) PCT No.: PCT/EP2004/000664

§ 371 (c)(1),
(2), (4) Date: Aug. 29, 2005

(87) PCT Pub. No.: WO2004/067576

PCT Pub. Date: Aug. 12, 2004

(65) Prior Publication Data

US 2006/0148999 A1  Jul. 6, 2006

Related U.S. Application Data

(60) Provisional application No. 60/456,284, filed on Mar. 20, 2003.

(30) Foreign Application Priority Data

Jan. 30, 2003  (EP) .................. 03250594

(51) Int. Cl.
*C08F 283/12* (2006.01)
(52) U.S. Cl. ............... 525/479; 528/28; 528/38
(58) Field of Classification Search ............ 525/479; 528/38, 28
See application file for complete search history.

(56) References Cited

U.S. PATENT DOCUMENTS

| | | | |
|---|---|---|---|
| 4,138,387 A | 2/1979 | Bluestein | |
| 4,965,312 A | 10/1990 | Nakai et al. | |
| 5,275,645 A | 1/1994 | Ternoir et al. | |
| 5,530,063 A | 6/1996 | Nagai et al. | |
| 5,663,215 A | 9/1997 | Milligan | |
| 6,231,990 B1* | 5/2001 | Lin et al. | 428/447 |
| 6,403,711 B1* | 6/2002 | Yang et al. | 525/100 |
| 6,743,854 B2 | 6/2004 | Yeats et al. | |

FOREIGN PATENT DOCUMENTS

| | | |
|---|---|---|
| EP | 0 656 409 A2 | 6/1995 |
| EP | 0 656 409 A3 | 4/1996 |
| EP | 1 063 270 A2 | 12/2000 |
| GB | 1 504 363 | 3/1978 |
| WO | WO 99/31179 A1 | 6/1999 |
| WO | WO 01/51575 A1 | 7/2001 |
| WO | WO 01/98419 A1 | 12/2001 |

OTHER PUBLICATIONS

European Opposition, European Application No. 04705061.2 dated Jan. 3, 2008.
Invoice for Jotacote PSO, Nov. 21, 2002.
Paints, Jotun, "Solving the maintenance puzzle," ONS 2002 Stravenger, Aug. 27-30, 2002 [retrieved from the internet, http://ons2002.netpower.no/articlepage.asp?iPageid=148&iParentId=25&ID=273].
Material Safety Data Sheet of Jotacote PSO, Component B, Aug. 21, 2002.
Data Sheet of Jotacote PSO, Feb. 13, 2002.
Material Safety Data Sheet of Jotacote PSO, Component A, Jul. 16, 2001.

* cited by examiner

*Primary Examiner*—Kuo-Liang Peng
(74) *Attorney, Agent, or Firm*—Kenyon & Kenyon LLP

(57) ABSTRACT

Ambient temperature curing coating composition comprising—a branched alkoxy-functional polysiloxane having the formula R2-O-[Si(R1)$_2$—O]$_n$—R2, wherein each R1 is selected from the group consisting of alkyl, aryl, and alkoxy groups having up to six carbon atoms, and Osi(OR3)$_3$ groups, wherein each R3 independently has the same meaning as R1, each R2 is selected from the group consisting of hydrogen and alkyl and aryl groups having up to six carbon atoms, and wherein n is selected such that the molecular weight of the polysiloxanes is in the range of from 500 to about 2,000,—a catalyst, and—an acrylic polymer. The acrylic polymer is substantially free of functional groups that can react with the polysiloxane or with the catalyst in the coating composition.

17 Claims, 1 Drawing Sheet

AMBIENT TEMPERATURE CURING COATING COMPOSITION

The present invention relates to a room temperature curable coating composition comprising a polysiloxane and an acrylic polymer. The benefits of adding an acrylic polymer to a polysiloxane based coating composition are, for example, faster drying of the composition and increased hardness of the cured coating. Additionally, replacing part of the polysiloxane with acrylic polymer has cost-saving advantages.

Room temperature curable compositions comprising a polysiloxane and an acrylic polymer are known. For example, U.S. Pat. No. 4,138,387 discloses compositions comprising solid particles of acrylic polymer dispersed in an organopolysiloxane fluid. The compositions described are dispersions that can be cured to rubbers having an elongation to break of about 120 to about 190%. These compositions generally are too soft and too flexible to be used as finish coatings or primer coatings, as they are easily damaged.

WO 99/31179 discloses a sealant composition comprising solid particles comprising a low Tg polymer and a high Tg polymer dispersed in a polysiloxane. The solid particles can be acrylic copolymers. The elongation to break of the cured sealant generally is from about 250 to about 1,600%. These compositions generally are too soft and too flexible to be used as finish coatings or primer coatings, as they are easily damaged.

U.S. Pat. No. 5,530,063 discloses a composition comprising a linear organopolysiloxane, a polymer having an ethylenically unsaturated double bond which may be an acrylic polymer, an epoxy compound, a curing agent for the epoxy compound, and a curing catalyst for the linear organopolysiloxane. The coating is, for instance, useful as sealing, as adhesive, or as coating composition. The elongation to break of the obtained coatings reported in this document is above 300%. These compositions generally are too soft and too flexible to be used as finish coatings or primer coatings, as they are easily damaged.

WO 01/51575 discloses an ambient curing coating composition comprising a polysiloxane, a glycidyl-functional acrylic polymer, and a hardener. A drawback of this coating composition is that it needs to be packed in a so-called two-pack system; the hardener is packed separately from the polysiloxane. This is disadvantageous, as the pack comprising the hardener and the pack comprising the polysiloxane and the glycidyl-functional polymer need to be mixed thoroughly before application of the composition. And, after mixing, the pot-life is short, i.e. about half an hour to at most four hours. This is because the reaction of the components starts in the pot after mixing of the components. Another drawback is that the ratio of the hardener to the other components is of importance, thus care should be taken that all contents of one pack are mixed with all contents of the other pack.

Figure 1:
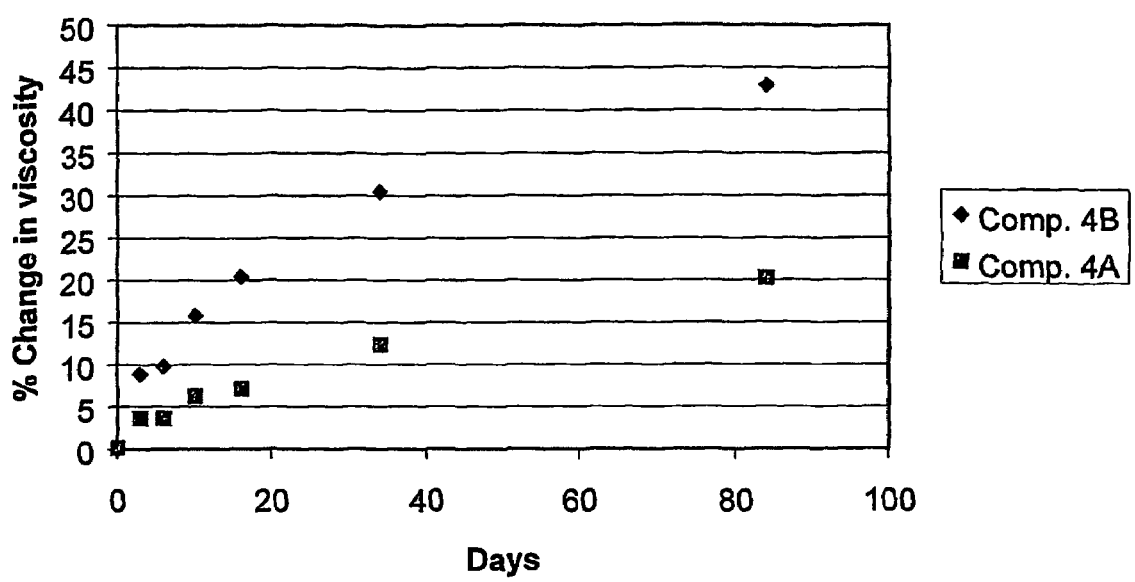
FIG. 1 illustrates the viscosity rise as a function of storage time for (i) a coating composition according to the present invention (coating composition 4A), which comprises a polysiloxane, a catalyst, and an acrylic polymer, which is substantially free of functional groups that can react with the polysiloxane or with the catalyst in the coating composition, and (ii) a comparative coating composition (coating composition 4B), which comprises a polysiloxane, a catalyst, an alloxysilyl-frnctional acrylic polymer, and no acrylic polymer, which is substantially free of functional groups that can react with the polysiloxane or with the catalyst in the coating compositon.

EP 1 063 270 discloses compositions comprising a polyorgano siloxane resin, an acrylic resin, an organotitanate, a silane or partial hydrolysate thereof, and an organic liquid. The silane may be a tetra-alkoxy silane. The organic groups of the polysiloxane may be acyclic hydrocarbon radicals, monovalent alicyclic hydrocarbon radicals, and monovalent aromatic hydrocarbon radicals. Functional groups, like alkoxy, are not mentioned or suggested for the organic groups on the polysiloxane. The compositions described can be used as primer compositions for bonding room temperature vulcanisable silicone elastomers to diverse substrates.

GB 1,504,363 discloses a water-repellent facade-protecting paint comprising an acrylic polymer, a polysiloxane, and a catalyst. The polysiloxane has a relatively low molecular weight, but there is no further indication as to the molecular weight of the polysiloxane in the composition. The paints are said to have a high binder content and a low solvent content, but the compositions of the Examples comprise about 50% by weight solvent. As there has been increased concern in recent years about the release of volatile solvents into the atmosphere, there has been a consequent need to reduce the volatile organic solvent content of coating compositions to below 50% by weight.

U.S. Pat. No. 4,965,312 discloses a vehicle composition for coating materials able to form coats that are heat resistant. The vehicle composition is a non-aqueous dispersion of a vinyl polymer in an organic liquid, with an alkoxysiloxane polymer as dispersion stabiliser. The solvent content in the final composition is not given. While during the preparation of the vinyl polymer a radical polymerisation initiator may be used, it is not mentioned or suggested that the final vehicle composition comprises a catalyst.

WO 01/98419 discloses an ambient curing coating composition comprising a polysiloxane and an alkoxysilyl-functional acrylic polymer. The composition can be packed together as a so-called one-pack composition. A drawback of this coating composition, however, is that it has a relatively short shelf life.

The present invention provides a solution to the drawbacks associated with the above-mentioned prior art. Another aim of the present invention is to provide a coating composition with which cured coating films having good bulk properties can be prepared in order to obtain films with a good durability.

The ambient temperature curable coating composition according to the present invention comprises:

a branched alkoxy-functional polysiloxane, in other words a non-linear alkoxy-functional polysiloxane, having the formula:

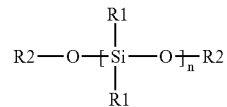

wherein each R1 is independently selected from the group consisting of alkyl, aryl, alkoxy groups having up to six carbon atoms, and $OSi(OR3)_3$ groups, wherein each R3 independently has the same meaning as R1, each R2 is selected from the group consisting of hydrogen and alkyl and aryl groups having up to six carbon atoms, and wherein n is selected such that the molecular weight of the polysiloxanes is in the range of from 200 to about 5,000, preferably 500-2,000, a catalyst, and an acrylic polymer.

The acrylic polymer is substantially free of functional groups that can react with the polysiloxane or with the catalyst in the coating composition. The coating composition preferably comprises more than 60% by weight solids.

It was found that the coating composition according to the present invention has an increased shelf life compared to the compositions described in WO 01/98419. This composition is suitable to prepare cured films with good bulk properties and a good durability. It is also suitable to prepare coatings having a high gloss which appeared to be retained remarkably well on weathering and UV exposure. Coating compositions especially suitable to prepare good high gloss coatings preferably comprise more than 30% by weight of polysiloxane, calculated based on the total weight of the binder.

The elongation to break of coatings prepared with a coating composition according to the present invention is less than 100%, preferably less than 20%, more preferably less than 5%. The glass transition temperature, Tg, of cured films prepared with a coating composition according to the present invention is higher than 0° C., preferably higher than 10° C., more preferably higher than 25° C. The molecular weight between cross-links of coatings prepared with a coating composition according to the present invention is less than 2,000 daltons, preferably less than 1,000 daltons, more preferably less than 500 daltons, and ideally less than 250 daltons.

The glass transition temperature (Tg) of a cured coating film can, for example, be measured according to ASTM method E1356-98, which is a standard test method for assignment of the glass transition temperature by Differential Scanning Calorimetry for differential thermal analysis. Calibration of the test apparatus can be performed according to, for example, ASTM method E1363-97e1, which is a standard test method for temperature calibration of thermomechanical analysers.

The molecular weight between cross-links ($M_c$) of the coating can be determined from measuring the rubbery modulus of the coating using dynamic mechanical thermal analysis (DMTA or DMA) techniques, using the following relationship:

$$M_c = \frac{3\rho RT}{E'}$$

wherein:

$\rho$ is the density of the polymer (g.m$^{-1}$)

R is the gas constant (J.K$^{-1}$.mol$^{-1}$)

T is temperature (K)

E' is the rubbery modulus (Pa)

DMTA (DMA) measurements can be performed, for example, as described by Patrick K. Gallagher in *Thermal Characterization of Polymeric Materials*, Volume 1, ed. Edith A. Turi, pub. Academic Press ISBN 0-12-703783-7, pages 133 to 149.

The coating composition of the present invention preferably comprises a volatile organic content (VOC) of less than 430 grams per litre of organic solvent. More preferably, the coating composition comprises a VOC of less than 340 grams per litre, even more preferably a VOC of less than 250 grams per litre.

The solids content of a composition according to the present invention preferably is higher than 60% by weight, more preferably higher than 70% by weight, even more preferably 80% by weight, based on the total coating composition.

The coating composition of the present invention preferably is substantially epoxy-free, as the presence of an epoxy component and the curing agent for the epoxy compound may affect the durability of the coating. For instance, the gloss and colour retention properties may be influenced. Especially after exposure to light, the appearance of a coated substrate may be affected. By the term "substantially epoxy-free" is meant that the coating composition comprises less than 0.5% by weight of epoxy compounds, preferably less than 0.1% by weight of epoxy groups, calculated on the total coating composition. Most preferably, the coating composition according to the present invention is completely epoxy-free.

The branched polysiloxane that is present in the coating composition according to the invention may comprise cyclic siloxane rings. From these cyclic siloxane rings groups may be branched off. The polysiloxane has an average functionality of more than two. That is, on average the polysiloxane comprises more than two functional group per molecule. Preferably, the polysiloxane has an average functionality of more than three. These functional groups can react with each other and may react with the catalyst if the catalyst has suitable functionality.

As stated above, each R1 of the polysiloxane is independently selected from the group consisting of alkyl, aryl, alkoxy groups having up to six carbon atoms, and OSi(OR3)$_3$ groups, wherein each R3 independently has the same meaning as R1, each R2 is selected from the group consisting of hydrogen and alkyl and aryl groups having up to six carbon atoms. R1 and R2 groups having more than six carbon atoms tend to impair the hydrolysis of the polysiloxane due to the relatively low volatility of each alcohol analogue. Preference is given to the use of alkoxysilyl-functional polysiloxane.

Methoxy-, ethoxy-, and silanol-functional polysiloxanes having molecular weights in the range of about 400 to about 2,000 are preferred for formulating coating compositions according to present invention. Methoxy-, ethoxy-, and silanol-functional polysiloxanes having molecular weights of less than 400 would produce a coating composition that is brittle and offers poor impact resistance. Nevertheless, small amounts of liquid methoxy-, ethoxy-, or silanol-functional polysiloxanes with a molecular weight below 400 can be tolerated. Any liquid methoxy-, ethoxy-, and silanol-functional polysiloxane with a molecular weight above 400 can be used, though it is preferred to use polysiloxanes with a molecular weight of less than 2,000, as they enable the production of compositions that require few if any additional solvents to achieve application viscosity, i.e. which can be used without adding solvent in excess of current volatile organic content (VOC) requirements. In general, a high-molecular weight polysiloxane can be used without violating VOC requirements by mixing it with a reactive or non-reactive diluent. However, normally this will affect film properties.

Suitable polysiloxanes that can be used in the composition according to the present invention include: DC 3037 and DC 3074 (both ex Dow Corning), or SY 231, SY 550, and MSE 100 (all ex Wacker).

The acrylic polymer, which is substantially free of functional groups that can react with the polysiloxane or with the catalyst in the coating composition, can be prepared by (co) polymerising one or more olefinically unsaturated monomers. This is usually done using a polymerisation initiator.

Examples of ethylenically unsaturated monomers which can be (co)polymerised are acrylic esters such as butyl (meth)acrylate, methyl (meth)acrylate, ethyl (meth)acrylate, propyl (meth)acrylate, n-hexyl (meth)acrylate, isopropyl (meth)acrylate, butyl (meth)acrylate, 2-ethylhexyl methacrylate or acrylate, cyclohexyl (meth)acrylate, 2,2,5-trimethylcyclohexyl (meth)acrylate, isobornyl (meth)acrylate, acrylonitrile, methacrylonitrile, trimethoxysilyl propyl(meth)acrylate, and vinyl compounds such as styrene, vinyl acetate or vinyl chloride, wherein the term (meth)acrylate means acrylate or methacrylate.

To prepare a coating composition with a low VOC, the acrylic polymer can be prepared, for example, by free radical polymerisation or any other reaction in the presence of a reactive diluent which is an organic compound of viscosity less than 2 Pa·s (20 Poise) at 25° C. Preference is given to the use of a reactive diluent having at least one functional group which is non-reactive with respect to the olefinically unsaturated monomers and which is capable of further reaction to form a polymer network. It was found that low-viscosity polysiloxanes can be used in the preparation of the acrylic polymer.

Reactive diluents that can be used in the preparation of the acrylic polymer include alkoxysilyl-functional polysiloxanes, such as DC 3037 and DC 3074 (both ex Dow Corning), or SY 231, SY 550, and MSE 100 (all ex Wacker); monomeric alkoxysilanes, such as trimethoxypropyl silane, dimethoxydiphenyl silane, and tetraethyl orthosilicate; and organofunctional monomeric alkoxysilanes, such as acetoacetoxypropyl trimethoxysilane and acetoacetoxy-propyl triethoxysilane.

The acrylate polymer is preferably prepared from a formulation comprising (methyl) methacrylate and butyl acrylate in a reactive diluent. Optionally, the formulation further comprises other olefinically unsaturated monomers. In a highly preferred embodiment, the reactive diluent is a polysiloxane and this polysiloxane is the same as the polysiloxane that is present in the coating composition according to the present invention.

The choice of the type(s) of monomer(s) and the amounts of the monomers from which the acrylic polymer is prepared determine the glass transition temperature of the resulting acrylic polymer. The glass transition temperature (Tg) of the acrylic polymer can be between −50° C. and +100° C. Preferably, the Tg of the acrylic polymer is between 0° C. and 100° C., more preferably between 20° C. and 80° C., and most preferably between 30° C. and 70° C.

Preferably, the formulation for the preparation of the acrylic polymer comprises 20-80% by weight of polysiloxane and 80-20% by weight of acrylic monomers, more preferably 30-80% by weight of polysiloxane and 20-70% by weight of acrylic monomers, even more preferably 40-70% by weight of polysiloxane and 30-60% by weight of acrylic monomers, wherein the % by weight is calculated based on the total weight of the formulation comprising the olefinically unsaturated monomers and the polysiloxane before the start of the polymerisation reaction of the acrylate monomers.

Preferably, the formulation for the preparation of the acrylic polymer comprises 1-60% by weight of methyl methacrylate and 0-70% by weight of butylacrylate, more preferably 5-50% by weight of methyl methacrylate and 0-60% by weight of butylacrylate, even more preferably 5-40% by weight of methyl methacrylate and 0-50% by weight of butylacrylate, wherein the % by weight is calculated based on the total weight of the formulation comprising the olefinically unsaturated monomers and the polysiloxane before the start of the polymerisation reaction of the acrylate monomers.

As indicated above, preference is given to a process for the preparation of the acrylic polymer from ethylenically unsaturated monomers by addition polymerisation while in solution in a reactive diluent. The polymerisation is preferably carried out in the substantial absence of nonfunctional volatile solvent, that is, a volatile solvent that will not take part in the polymerisation reactions of the ethylenically unsaturated monomers nor react with the polymerisation initiator, and that also is not capable of further reaction to form a polymer network. Alternatively, a small proportion, for example up to 10 to 20% by weight of the polymerisation reaction mixture, of a non-functional volatile solvent which is miscible with the reactive diluent can be present. Some or all of the monomers can be pre-dissolved in the reactive diluent, but preferably the monomers, together with (a) free radical initiator(s) and any chain transfer agent used, are gradually added to the diluent. For example, the reactive diluent can be heated to a temperature in the range of 50-200° C., and the monomers, initiator, and chain transfer agent are added over a period of up to 12 hours, preferably in less than 4 hours, while the temperature of the solution is maintained during the addition and for a further period of 0.5-4 hours after the addition. A further charge of initiator may be added during this further period to reduce the level of unreacted monomer. However, it is also possible to reduce this level by distilling off the unreacted monomer from the reaction mixture.

The free radical initiator can for example be a peroxide or peroxy ester such as benzoyl peroxide, di-tert-butyl peroxide, tert-butyl peroxy-3,5,5-trimethyl hexanoate, 2,5-bis(2-ethylhaxanoyl-peroxy)-2,5-dimethyl hexane, or tertiary butyl peroctoate or an azo compound such as azobisisobutyronitrile or azo-bis(2-methylbutyronitrile).

A chain transfer agent, for example dodecanethiol, butanethiol, pentaerythritol tetra (mercaptopropionate), mercaptopropyl trimethoxysilane, or dibutyl phosphite, may be present during polymerisation. The level of initiator and of chain transfer agent, if present, is preferably controlled such that the number average molecular weight (Mn) of the polymer produced is not more than 10,000 and preferably is in the range of 600 to 5,000, most preferably 1,000 to 3,000, in order to maintain a workable viscosity. For example, the amount of free radical initiator used (by weight based on monomers) generally is at least 1%, preferably 2 to 10%, when no chain transfer agent is used, or a level of 1 to 5% initiator can be used in conjunction with 1 to 10% chain transfer agent.

The coating composition according to the present invention also comprises a catalyst. The catalyst present in the curable polymer composition in general can be any catalyst active in cross-linking the functional groups present in the polysiloxane under the intended conditions of curing. The catalyst can for example be an organic or inorganic Lewis acid or base, preferably a Lewis base.

Optionally, the catalyst is an alkoxytitanium compound, for example a titanium chelate compound such as a titanium bis(acetylacetonate) dialkoxide, e.g., titanium bis(acetylacetonate) diisopropoxide, or an alkanolamine titanate, e.g., titanium bis(triethanolamine) diisopropoxide, or an alkoxytitanium compound which is not a chelate such as tetra(isopropyl) titanate or tetrabutyl titanate. Such titanium compounds containing alkoxy groups bonded to the titanium may not act as catalysts alone, since the titanium alkoxide group is hydrolysable and the catalyst may become bound to the cured silane or siloxane by Si—O—Ti linkages. The presence of such titanium moieties in the cured product may be advantageous in giving even higher heat stability. The titanium compound can for example be used at 0.1 to 5% by weight of the binder. Corresponding alkoxide compounds of zirconium or aluminium are also useful as catalysts.

An alternative catalyst is a nitrate of a polyvalent metal ion such as calcium nitrate, magnesium nitrate, aluminium nitrate, zinc nitrate, or strontium nitrate. Calcium nitrate has been suggested as a catalyst for the amine curing of epoxy resins, but it has never been suggested for curing silane or siloxane materials. Surprisingly, we have found that calcium nitrate is an effective catalyst for the curing by Si—O—Si condensation of a silane or siloxane containing at least two alkoxy groups bonded to silicon by Si—O—C bonds, when the composition also includes an organic amine. The calcium nitrate is preferably used in its tetrahydrate form, but other hydrated forms can be used. The level of calcium nitrate catalyst required generally is not more than 3% by weight of the binder, for example 0.05 to 3% by weight. Coatings cured using calcium nitrate catalyst are especially resistant to yellowing on exposure to sunlight.

Another example of a suitable catalyst is an organotin compound, for example a dialkyltin dicarboxylate such as dibutyltin dilaurate or dibutyltin diacetate. Such an organotin catalyst can for example be used at 0.05 to 3% by weight of the binder of the coating composition.

Other compounds effective as catalysts in the coating compositions of the invention are organic salts, such as carboxylates, of bismuth, for example bismuth tris(neodecanoate). Organic salts and/or chelates of other metals such as zinc, aluminium, zirconium, tin, calcium, cobalt, or strontium, for example zirconium acetylacetonate, zinc acetate, zinc acetylacetonate, zinc octoate, stannous octoate, stannous oxalate, calcium acetylacetonate, calcium acetate, calcium 2-ethylhexanoate, cobalt naphthenate, calcium dodecylbenzenesulphonate, or aluminium acetate, may also be effective as catalysts.

Preferably, the catalyst is an amine chosen from the general classes of aliphatic amines, aliphatic amine adducts, polyamidoamines, cycloaliphatic amines and cycloaliphatic amine adducts, aromatic amines, Mannich bases, and ketimines, which each may be substituted wholly or in part with an aminosilane.

The aminosilane contains at least two, preferably three, alkoxy groups bonded to silicon by Si—O—C bonds and also contains at least one primary or secondary amine group.

Preferably, the aminosilane has the general formula Y—Si—(O—X)$_3$, wherein Y is H(HNR)$_a$ and a is an integer from one to six, each R is a difunctional organic radical independently selected from the group consisting of aryl, alkyl, dialkylaryl, alkoxyalkyl, and cycloalkyl radicals, and R can vary within each Y molecule. Each X may be the same or different, and is limited to alkyl, hydroxyalkyl, alkoxyalkyl, and hydroxyalkoxyalkyl groups containing fewer than about six carbon atoms.

Preferred aminosilanes are, for example: aminoethyl triethoxysilane, 3-aminopropyl triethoxysilane, n-phenylaminopropyl trimethoxysilane, trimethoxy-silylpropyl diethylene triamine, 3-(3-aminophenoxy)propyl trimethoxysilane, aminoethyl aminomethylphenyl trimethoxysilane, 2-aminoethyl 3-aminopropyl tris 2-ethylhexoxysilane, and n-aminohexyl aminopropyl trimethoxysilane, or mixtures thereof.

Optionally, the coating composition according to the present invention comprises a low-molecular weight alkoxysilane having the general formula

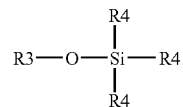

wherein R3 is selected from the group consisting of alkyl and cycloalkyl groups containing up to six carbon atoms and aryl groups containing up to ten carbon atoms. R4 is independently selected from the group consisting of alkyl, alkoxy, hydroxyalkyl, alkoxyalkyl, and hydroxyalkoxyalkyl groups containing up to six carbon atoms. An example of a low-molecular weight alkoxysilane according to the above formula that can be used in the coating composition is dimethoxydiphenyl silane.

The amount of such a low-molecular weight alkoxysilane in the coating composition preferably is between 5 and 20% by weight, more preferably about 10% by weight, based on the total coating composition.

Optionally, the coating composition comprises an acrylic polymer having functional groups that can react with the polysiloxane or with the catalyst in the coating composition. An example of such an acrylic polymer is an alkoxysilyl-functional acrylic polymer, which is for instance described in WO 01/98419. Another example is an epoxy-functional acrylic polymer, such as a glycidyl-functional acrylic polymer, which is for instance described in WO 01/51575. Such acrylic polymers can be obtained through a polymerisation reaction in a reactive diluent. Preferably, this reactive diluent is the polysiloxane, and this polysiloxane is the same as the polysiloxane that is present in the coating composition according to the present invention. Such an acrylic polymer having functional groups that can react with the polysiloxane or with the catalyst in the coating composition is preferably prepared separately from the acrylic polymer which is substantially free of functional groups that can react with the polysiloxane or with the catalyst in the coating composition. This is to avoid ending up with a composition solely comprising siloxane copolymers having functional groups that can react with the polysiloxane or with the catalyst.

The coating compositions of the invention may contain one or more further ingredients. Thus they may contain one or more pigments, for example titanium dioxide (white pigment), coloured pigments such as yellow or red iron oxide or a phthalocyanine pigment and/or one or more strengthening pigments such as micaceous iron oxide or crystalline silica and/or one or more anticorrosive pigments such as metallic zinc, zinc phosphate, wollastonite or a chromate, molybdate or phosphonate and/or a filler pigment such as barytes, talc or calcium carbonate. The composition may contain a thickening agent such as fine-particle silica, bentonite clay, hydrogenated castor oil, or a polyamide wax. The composition may also contain a plasticiser, pigment dispersant, stabiliser, flow aid, or thinning solvent.

The coating compositions of the invention generally cure at ambient temperatures, for example temperatures in the range from 5 to 30° C., and are thus suitable for application to large structures where heat curing is impractical. The coating compositions of the invention alternatively can be cured at elevated temperatures, for example temperatures in the range from 30 to 50° C. up to 100 or 130° C., to speed up the curing. The hydrolysis of silicon-bonded alkoxy groups depends on the presence of moisture; in almost all climates atmospheric moisture is sufficient, but a controlled amount of moisture may need to be added to the coating when curing at elevated temperature or when curing in very low humidity (desert) locations. The water is preferably packaged separately from any compound or polymer containing silicon-bonded alkoxy groups.

The coating compositions of the invention in general can be used as finish coatings and/or primer coatings. Coating compositions containing a relatively high proportion of polysiloxane have a high gloss which is retained remarkably well on weathering and UV exposure. They are particularly suitable for coating substrates that are exposed to the weather, e.g. sunlight, for long periods before recoating. The highest levels of gloss can be achieved if the coating composition includes an organic solvent (thinner) such as xylene, although the use of solvent is not generally required in the coating compositions of the invention, which can be solvent-free coatings having a very low measured volatile organic content. The coating composition may contain an alcohol, e.g. ethanol or butanol, to extend the pot-life and control the initial speed of curing.

A finish coating according to the invention can be applied over various primer coatings, for example inorganic zinc silicate or organic zinc-rich silicate primers and organic, e.g. epoxy resin, primers containing zinc metal, corrosion-inhibiting, metal flake or barrier pigments. The coating composition of the invention has particularly good adhesion to inorganic zinc silicate coatings without needing an intermediate tie coat or mist coat. A finish coating composition of the invention can also be applied directly over aluminium or zinc "metal spray" coatings, or over galvanised steel, stainless steel, aluminium, or plastics surfaces such as glass fibre reinforced polyester or a polyester gel coat. The coating composition can for example be used as a finish coating on buildings, steel structures, automobiles, aircraft and other vehicles, and general industrial machinery and fitments. The finish coating can be pigmented or it can be a clear (non-pigmented) coat, particularly on cars or yachts. The coating composition can be applied directly to prepared carbon steel as a primer/finish.

The coating composition of the invention alternatively can be used as a protective primer coating, particularly on steel surfaces, for example bridges, pipelines, industrial plants or buildings, oil and gas installations, or ships. For this use it is generally pigmented with anticorrosive pigments. It may for example be pigmented with zinc dust; coatings according to the invention have a similar anticorrosive performance to known zinc silicate coatings but are less liable to mud cracking and can be readily overcoated, particularly with a polysiloxane finish, for example a finish coat according to the present invention. Primer coating compositions according to the invention can be used as maintenance and repair coatings on less than perfect surfaces such as aged blasted steel or "ginger" (steel which has been blasted and has started to rust in small spots), hand-prepared weathered steel, and aged coatings.

Preferably the components of a coating composition according to the present invention are packed together as a so-called one-pack composition. It is advisable to have only a small amount of moisture present in this composition.

The invention will be elucidated with reference to the following examples. These are intended to illustrate the invention but are not to be construed as limiting in any manner the scope thereof.

In the examples, pbw has the meaning of parts by weight.

EXAMPLES

Example 1

Acrylate Polymer Preparation

Acrylic polymers were prepared in a polysiloxane solvent mixture. The polysiloxane used, DC 3074 ex Dow Corning, was substantially non-reactive with respect to the olefinically unsaturated starting monomers for the acrylic polymers.

The alkoxysilyl-functional silicone resin DC 3074 and the solvent trimethyl benzene (TMB) were charged to a reaction flask that was fitted with a stirrer, a condenser, a nitrogen gas sparge, a thermocouple, and a feed port. The temperature was raised to 140° C. under a nitrogen atmosphere.

The monomers methyl methacrylate (MMA) and butyl acrylate (BA) and the initiator tertiary butyl peroxide (TBPO) were charged over two hours while the reaction temperature was held constant at 140° C. Upon completion of the feed, the reaction mixture was held at 140° C. for one hour, after which a further addition of initiator (~10% of the initial charge of TBPO) was made. The temperature was held at 140° C. for a further two hours. Then the reaction mixture was cooled to room temperature and discharged.

Five acrylate polymers were prepared this way. In the preparation of three of these polymers, the chain transfer agent tertiary dodecanethiol (TDT) was added to the reaction mixture.

TABLE 1

| Polymer No. | Polysiloxane[1] Pbw | TMB[2] Pbw | MMA[3] pbw | BA[4] Pbw | TBPO[5] pbw | TDT[6] Pbw |
|---|---|---|---|---|---|---|
| 1 | 400.0 | 50.0 | 75.0 | 25.0 | 5.5 | — |
| 2 | 300.0 | 50.0 | 50.0 | 150.0 | 9.8 | — |
| 3 | 300.0 | 50.0 | 50.0 | 150.0 | 9.8 | 3.6 |
| 4 | 325.0 | 50.0 | 150.0 | 25.0 | 9.9 | 3.4 |
| 5 | 400.0 | 50.0 | 75.0 | 25.0 | 5.5 | 1.9 |

[1]DC 3074 ex Dow Corning
[2]Trimethyl benzene
[3]Methyl methacrylate
[4]Butyl acrylate
[5]Tertiary butyl peroxide
[6]Tertiary dodecanethiol Example 2

Coating Composition Preparation

Coating compositions were prepared using the mixtures of acrylic polymer and polysiloxane prepared in Example 1. The coating compositions were formulated with different amounts of aminopropyl triethoxysilane (APTES), trimethyl benzene (TMB), and tetraethyl orthosilicate (TEOS). The formulation of the coating compositions is presented in Table 2.

TABLE 2

| Component | Pbw |
|---|---|
| Polymer[1] | 115.8 |
| Titanium dioxide[2] | 56.2 |
| Alcohol[3] | 4.0 |
| Defoamer[4] | 1.0 |
| Disparlon[5] | 2.0 |
| APTES[6] | 0.0-14.0 |

TABLE 2-continued

| Component | Pbw |
|---|---|
| TMB[7] | 0.0-14.0 |
| TEOS[8] | 0.0-14.0 |

[1]Polymer mixtures prepared in Example 1, comprising acrylic polymer in polysiloxane
[2]Kronos 2063 ex Kronos
[3]Isopropyl alcohol
[4]Byk 80 ex Byk-Chemie
[5]Disparlon 6650 ex Kusumoto Chemicals
[6]Aminopropyl triethoxy silane
[7]Trimethyl benzene
[8]Tetraethyl orthosilicate The coating compositions that were prepared according to the formulation presented in Table 2 are shown in Table 3.

TABLE 3

| Coating comp. No. | Polymer Number[1] | APTES[2] Pbw | TMB[3] pbw | TEOS[4] pbw |
|---|---|---|---|---|
| 1A | 1 | 14.0 | 14.0 | — |
| 1B-I | 2 | 7.0 | — | 14.0 |
| 1B-II | 2 | 14.0 | 14.0 | — |
| 1C | 3 | 7.0 | 14.0 | — |
| 1D | 4 | 14.0 | — | 14.0 |
| 1E | 5 | 7.0 | 14.0 | — |

[1]Polymer mixture prepared in Example 1, comprising acrylic polymer in polysiloxane
[2]Amino propyl triethoxy silane
[3]Trimethyl benzene
[4]Tetraethyl orthosilicate Example 3

Coating Composition Testing

The viscosity of the uncured coating compositions of Example 2 was measured. Next, the coating compositions were applied and cured. The length of time necessary for the coatings to become touch dry and the length of time that elapsed before the coatings became hard dry were determined in environments with different temperature and humidity. After curing, the hardness and gloss of the obtained coatings were tested.

The results of all tests are presented in Tables 4a and 4b.

TABLE 4a

| Coating comp. No. | Viscosity[1] Poise (25° C.) | Touch Dry[2] (10/80) Min. | Touch Dry[3] (25/50) Min. | Hard Dry[4] (25/50) Min. |
|---|---|---|---|---|
| 1A | 2.24 | 340 | 145 | 350 |
| 1B-I | 5.09 | 1,235 | 630 | 1,500 |
| 1B-II | 3.61 | 675 | 240 | 625 |
| 1C | 3.79 | 1,500 | 920 | 1,500 |
| 1D | 2.6 | 1,500 | 370 | 1,010 |
| 1E | 2.21 | 1,500 | 925 | 1,500 |

[1]Viscosity determined in Poise 25° C.
[2]Touch dry time in minutes at 10° C. and 80% relative humidity.
[3]Touch dry time in minutes at 25° C. and 50% relative humidity.
[4]Hard dry time in minutes at 25° C. and 50% relative humidity.

TABLE 4b

| Coating comp. No. | König Hardness[1] (10/80) | König Hardness[2] (25/50) | König Hardness[3] (40/25) | Gloss[4] |
|---|---|---|---|---|
| 1A | 45 | 103 | 78 | 77 |
| 1B-I | 7 | 13 | 4 | 62 |
| 1B-II | 12 | 26 | 19 | 84 |
| 1C | 4 | 9 | 3 | 36 |
| 1D | 24 | 24 | 15 | 47 |
| 1E | 57 | 57 | 11 | 65 |

[1]König Hardness after 7 days at 10° C. and 80% relative humidity.
[2]König Hardness after 7 days at 25° C. and 50% relative humidity.
[3]König Hardness after 7 days at 40° C. and 25% relative humidity.
[4]Gloss determined according to ASTM D523.

Example 4

Acrylate Polymer Preparation

Acrylic polymers were prepared in a polysiloxane solvent mixture. The polysiloxane used, DC 3074 ex Dow Corning, was substantially non-reactive with respect to the olefinically unsaturated starting monomers for the acrylic polymers.

The alkoxysilyl-functional silicone resin DC 3074 and the solvent trimethyl benzene (TMB) were charged to a reaction flask that was fitted with a stirrer, a condenser, a nitrogen gas sparge, a thermocouple, and a feed port. The temperature was raised to 140° C. under a nitrogen atmosphere.

The monomers methyl methacrylate (MMA), butyl acrylate (BA), and (optionally) trimethoxysilylpropyl methacrylate (TMSPMA) and the initiator tertiary butyl peroxide (TBPO) were charged over two hours while the reaction temperature was held constant at 140° C. Upon completion of the feed, the reaction mixture was held at 140° C. for one hour, after which a further addition of initiator (~10% of the initial charge of TBPO) was made. The temperature was held at 140° C. for a further two hours. Then the reaction mixture was cooled to room temperature and discharged.

Two polymers were prepared this way. In the preparation of acrylate polymer No. 7 trimethoxysilylpropyl methacrylate (TMSPMA) was added to the reaction mixture, which resulted in an alkoxysilyl-functional acrylic polymer.

TABLE 5

| Polymer No. | Polysiloxane[1] Pbw | TMB[2] Pbw | MMA[3] pbw | BA[4] Pbw | TBPO[5] pbw | TMSPMA[6] Pbw |
|---|---|---|---|---|---|---|
| 6 | 300.0 | 50.0 | 100.0 | 100.0 | 10.75 | — |
| 7 | 300.0 | 50.0 | 87.5 | 87.5 | 10.0 | 25.0 |

[1]DC 3074 ex Dow Corning
[2]Trimethyl benzene
[3]Methyl methacrylate
[4]Butyl acrylate
[5]Tertiary butyl peroxide
[6]Trimethoxysilylpropyl methacrylate Example 5

Coating Composition Preparation

Coating compositions were prepared using the mixtures of acrylic polymer and polysiloxane prepared in Example 4. The formulation of the coating compositions is presented in Table 6.

TABLE 6

| Component | Pbw |
|---|---|
| Polymer[1] | 165.0 |
| Titanium dioxide[2] | 80.0 |
| Disparlon[3] | 1.65 |
| APTES[4] | 10.0 |
| TEOS[5] | 20.0 |

[1]Polymer mixtures prepared in Example 4, comprising acrylic polymer in polysiloxane
[2]Kronos 2063 ex Kronos
[3]Disparlon 6650 ex Kusumoto Chemicals
[4]Aminopropyl triethoxy silane
[5]Tetraethyl orthosilicate Coating composition 4A (comprising polymer No. 6) and coating composition 4B (comprising polymer No. 7) were prepared according to the formulation presented in Table 6 and stored at 40° C.

Example 6

Coating Composition Testing

The viscosity rise as a function of storage time was measured for a coating composition according to the present invention, i.e. for coating composition 4A, which comprised a polysiloxane, a catalyst, and an acrylic polymer substantially free of functional groups that can react with the polysiloxane or with the catalyst in the coating composition. This data was compared to the viscosity rise as a function of storage time for coating composition 4B, which comprised a polysiloxane, a catalyst, an alkoxysilyl-functional acrylic polymer, and no acrylic polymer substantially free of functional groups that can react with the polysiloxane or with the catalyst in the coating composition.

The viscosity rise as a function of time is tabulated below.

| Days | Coating comp. Number 4A | Coating com. Number 4B |
|---|---|---|
| 0 | 11.5 | 21.8 |
| 3 | 11.9 | 23.7 |
| 6 | 11.9 | 23.9 |
| 10 | 12.2 | 25.2 |
| 16 | 12.3 | 26.2 |
| 34 | 12.9 | 28.4 |
| 84 | 13.8 | 31.1 |

Coating composition 4A demonstrates a slower rise in viscosity than coating composition 4B. This is shown graphically in FIG. 1.

The invention claimed is:

1. Ambient temperature curable coating composition comprising
a branched alkoxy-functional polysiloxane having the formula

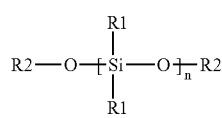

wherein each R1 is independently selected from the group consisting of alkyl groups having up to six carbon atoms, aryl groups having up to six carbon atoms, alkoxy groups having up to six carbon atoms, and $OSi(OR3)_3$ groups, wherein each R3 independently has the same meaning as R1 each R2 is independently selected from the group consisting of hydrogen, allyl, and aryl groups having up to six carbon atoms, and wherein n is selected such that the molecular weight of the polysiloxanes is in the range of from 200 to about 5,000,
an amino-functional catalyst,
an acrylic polymer which is substantially free of functional groups that can react with the polysiloxane or with the catalyst in the coating composition,
wherein said coating composition comprises more than 60% by weight solids.

2. Coating composition according to claim 1, wherein the acrylic polymer is obtained by polymerization in the polysiloxane.

3. Coating composition according to claim 2, wherein the catalyst is an aminosilane.

4. Coating composition according to claim 2, wherein the acrylic polymer has a glass transition temperature between 00C and 1000C.

5. Coating composition according to claim 1, wherein the catalyst is an aminosilane.

6. Coating composition according to claim 5, wherein the acrylic polymer has a glass transition temperature between 0° C. and 100°C.

7. Coating composition according to claim 5, wherein the coating composition has been obtained by polymerising 20-80% by weight of acrylic monomers in 80-20% by weight of polysiloxane, wherein the % by weight is calculated based on the total weight of the olefinically unsaturated monomers plus the polysiloxane before the start of the polymerisation reaction of the acrylate monomers, followed by adding the catalyst.

8. Coating composition according to claim 7, wherein the coating composition has been obtained by polymerising 1-60% by weight of methyl methacrylate and 0-70% by weight of butyl methacrylate in 20-80% by weight of polysiloxane, wherein the % by weight is calculated based on the total weight of the olefinically unsaturated monomers plus the polysiloxane before the start of the polymerisation reaction of the acrylate monomers, followed by adding the catalyst.

9. Coating composition according to claim 1, characterised in that wherein the acrylic polymer has a glass transition temperature between 0° C. and 100° C.

10. Coating composition according to claim 9, wherein the coating composition has been obtained by polymerising 20-80% by weight of acrylic monomers in 80-20% by weight of polysiloxane, wherein the % by weight is calculated based on the total weight of the olefuically unsaturated monomers plus the polysiloxane before the start of the polymerisation reaction of the acrylate monomers, followed by adding the catalyst.

11. Coating composition according to claim 1, characterised in that wherein the coating composition has been obtained by polymerising 20-80% by weight of acrylic monomers in 80-20% by weight of polysiloxane, wherein the % by weight is calculated based on the total weight of olefinically unsaturated monomers plus the polysiloxane before the start of the polymerisation reaction of the acrylate monomers, followed by adding the catalyst.

12. Coating composition according to claim 11, wherein the coating composition has been obtained by polymerising 1-60% by weight of methyl methacrylate and 0-70% by weight of butyl methacrylate in 20-80% by weight of polysiloxane, wherein the % by weight is calculated based on the total weight of olefinically unsaturated monomers plus the polysiloxane before the start of the polymerisation reaction of the acrylate monomers, followed by adding the catalyst.

13. A process for applying a protective coating, the process comprising applying the coating composition according to claim 1 to a surface.

14. A process for coating, the process comprising applying the coating composition according to claim 1 at ambient temperature of to a large structure selected from the group consisting of a ship, a bridge, a building, an industrial plant, and an oil rig.

15. Coating composition according to claim 1, wherein the acrylic polymer has a glass transition temperature between 0° C. and 100° C.

16. Coating composition according to claim 1, wherein the coating composition has been obtained by polymerising 20-80% by weight of acrylic monomers in 80-20% by weight of polysiloxane, wherein the % by weight is calculated based on the total weight of olefinically unsaturated monomers plus the polysiloxane before the start of the polymerisation reaction of the acrylate monomers, followed by adding the catalyst.

17. Coating composition according to claim 16, wherein the coating composition has been obtained by polymerising 1-60% by weight of methyl methacrylate and 0-70% by weight of butyl methacrylate in 20-80% by weight of polysiloxane, wherein the % by weight is calculated based on the total weight of the olefinically unsaturated monomers plus the polysiloxane before the start of the polymerisation reaction of the acrylate monomers, followed by adding the catalyst.

* * * * *